Aug. 28, 1951  J. H. F. STEWART  2,565,701
FLUID SEALING DEVICE
Filed Nov. 17, 1945  2 Sheets-Sheet 1
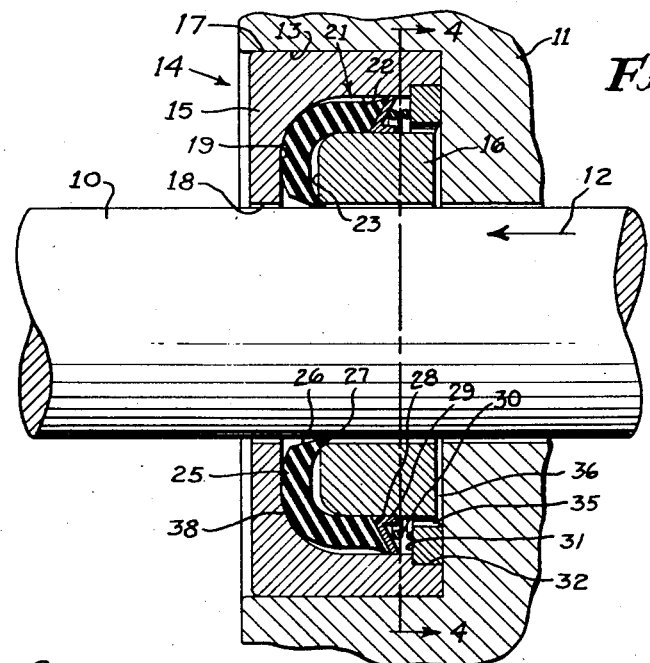
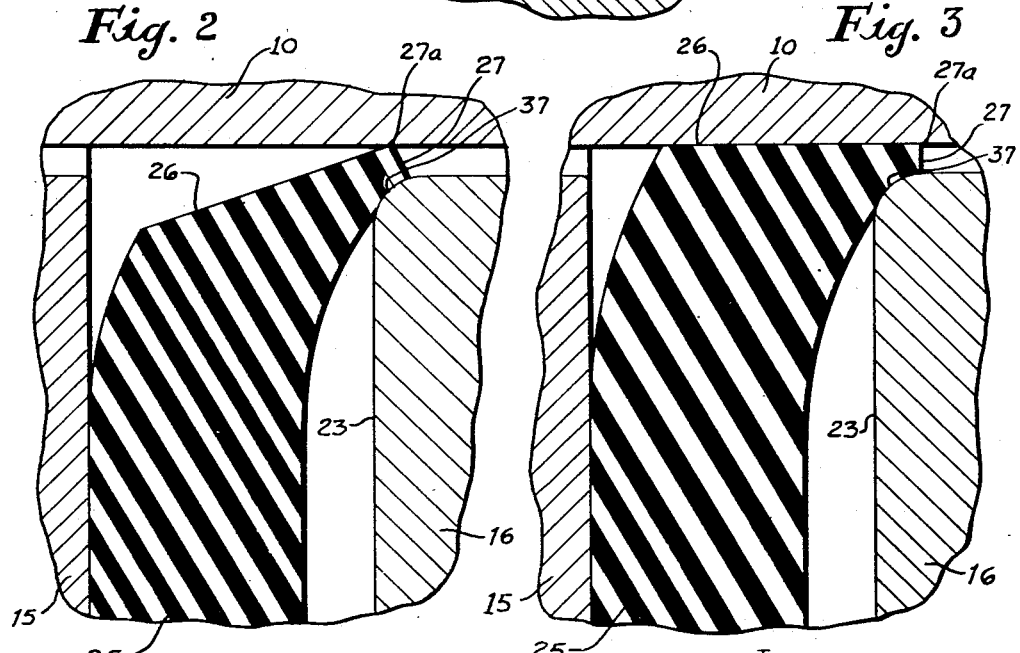
INVENTOR
JOHN H. F. STEWART
BY HARRIS, KIECH, FOSTER & HARRIS
FOR THE FIRM
ATTORNEYS Aug. 28, 1951 J. H. F. STEWART 2,565,701
FLUID SEALING DEVICE
Filed Nov. 17, 1945 2 Sheets-Sheet 2
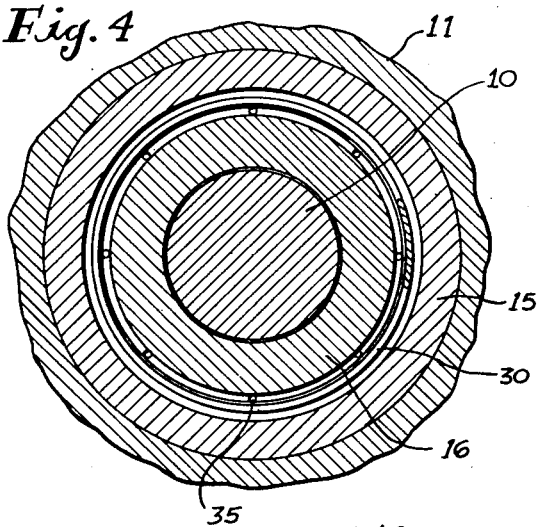
Fig. 4
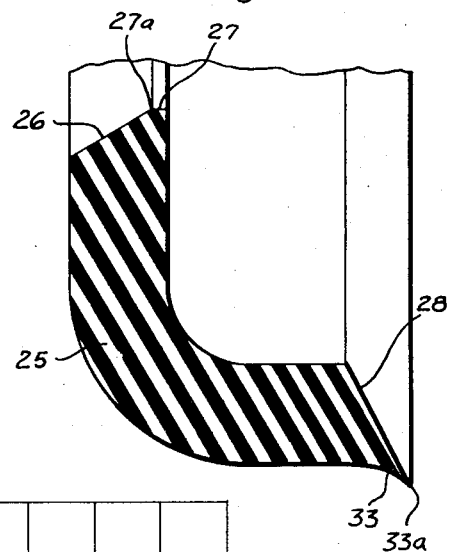
Fig. 5
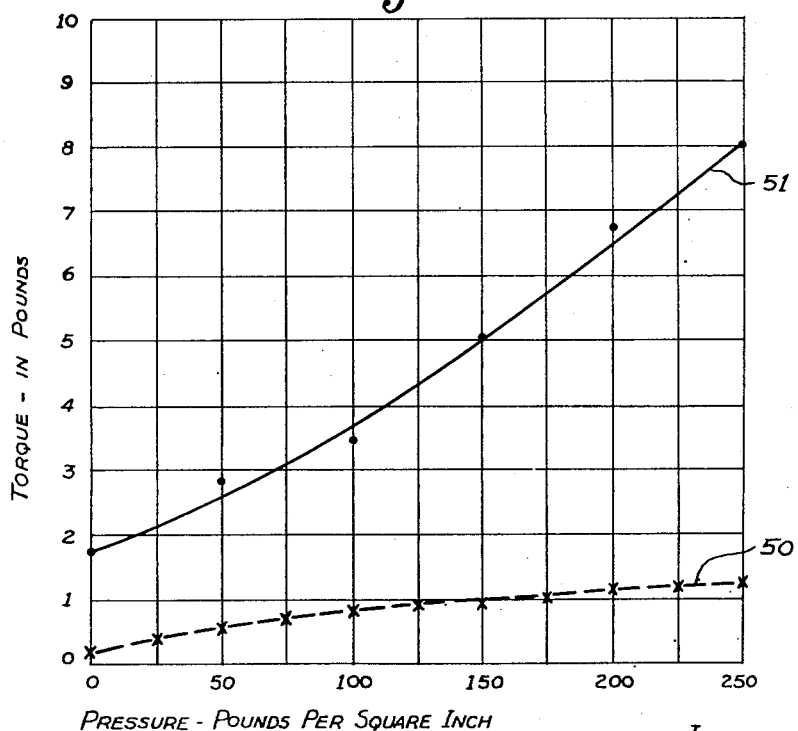
Fig. 6
INVENTOR
JOHN H. F. STEWART
BY HARRIS, KIECH, FOSTER & HARRIS
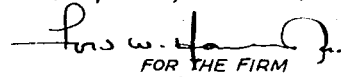
FOR THE FIRM
ATTORNEYS Patented Aug. 28, 1951

2,565,701

UNITED STATES PATENT OFFICE 2,565,701

FLUID SEALING DEVICE

John H. F. Stewart, Detroit, Mich.

Application November 17, 1945, Serial No. 629,263

1 Claim. (Cl. 286—5)

My invention relates to the packing art and, more particularly, to an annular device adapted to form a fluid-tight seal between a pair of adjacent surfaces.

The invention has particular utility in forming a fluid-tight seal around a rotating shaft, and will be described in connection therewith for the purpose of illustration. It will be understood, however, that the invention is applicable to other uses and that I do not desire to be limited by the specific embodiment described hereinafter.

The present invention is an improvement over the packing disclosed in my Patent No. 2,332,763, issued October 26, 1943, to which reference is hereby made. Said patent generally discloses the conception of providing a tubular sealing sleeve formed of rubber or other resilient material, which is moved axially by fluid pressure or spring pressure, or both, through a confining passage into engagement with a relatively movable cylindrical surface such as a shaft.

I have found that installations of such packing are frequently provided in which the shaft will not be in true axial alignment with the retaining means for the sealing sleeve, i. e., the shaft may have a small degree of run-out or eccentricity relative to the sleeve. In this case, if the sleeve is closely confined by its retaining means, there is a tendency for the run-out of the shaft to cause excessive wear on the sealing end of the sleeve, which, if the condition is sufficiently serious, destroys the effectiveness of the seal so as to permit leakage therepast and requires frequent replacements of the sleeve. This is often a serious disadvantage, and it is therefore a primary object of my present invention to provide a sealing device of this general character in which at least the sealing end of the sleeve is floatingly mounted so as to tolerate substantial relative run-out of the shaft without causing undue wear on the sleeve or impairment of the fluid-tight seal formed thereby. I prefer to accomplish this by loosely retaining at least the sealing end of the sealing sleeve so that the sleeve may be bent to a configuration in which the natural resilience of the sleeve can be taken advantage of to provide the desired floating relationship between the sealing end and the surface engaged thereby.

In the use of my prior patented packing I have found that in some installations sealing is imperfect, and some leakage past the sealing sleeve may result. This is true particularly where the sealing edge of the sleeve which is in sealing engagement with a shaft is relatively thick.

To obviate the foregoing disadvantages, it is therefore a further object of the present invention to provide such a sealing device in which the sealing end of the sealing sleeve is bevelled on the normally low pressure side of the sleeve so as to form a relatively thin sealing edge which forms a seal with the shaft which is substantially more fluid-tight under normal operating conditions than my prior patented packing. Such a thin sealing edge normally tends to conform more quickly to the periphery of the shaft than does a relatively thick sealing edge, which insures that an effective fluid seal is immediately formed thereby with the shaft, and no "breaking-in" is required.

Another object of the invention is to provide such a sealing device having a sealing sleeve provided with a thin sealing edge, in which the sealing edge is directed toward the normally high pressure side of the sleeve. By reduction of the thickness of the sealing edge, fluid pressure applied thereto has less tendency to move the sealing edge along the shaft.

It is also an object to provide in such a sealing device a sealing edge in which the initial sealing contact of the sealing member with the shaft is established automatically when the seal is first assembled. It has been found that, where a sharp feather edge having an acute angle in cross section is provided, considerable difficulty is experienced in forming such an edge perfectly, and a short period of run-in of the seal frequently desirable before imperfections can be worn down. By forming the thin sealing edge with an obtuse angle at the edge of the bevelled portion, a more perfect initial seal is established with greater facility, and any necessity of running-in the seal is avoided.

A further object of the present invention is to provide such a sealing device in which the outer end of the sealing sleeve is provided with means for forming an effective fluid-tight seal between the sleeve and a guide wall of the passage in which the sleeve is retained, so as to prevent fluid leakage past the outer end of the sleeve. I prefer to accomplish this by providing on the outer end of the sleeve a sealing lip which is held at all times in fluid-tight engagement with the guide wall. I also prefer to bevel the outer end of the sleeve so that an axially directed force on the end tends to maintain the fluid-tight sealing engagement between the outer side of the sleeve and the guide wall.

A further object of the invention is to provide a seal of the character described which is effective for both vacuum and pressure conditions. It has been found with some seals as previously constructed that, when pressure conditions are reversed, difficulty is experienced because the reversed pressure conditions permit fluid to pass from the shaft along the outer surface of the sealing sleeve when it is forced out of contact with the outer retainer member by such reversed pressure conditions. I have found that by the use of the bevel on the outer end of the sleeve, together with an outwardly flared lip portion, reversed pressure conditions will press the outwardly flared lip into contact with the outer guide wall to prevent leakage at this zone.

Still another object of the invention is to provide a sealing device having a sealing sleeve adapted to engage a relatively movable member in which both ends of the sleeve are subjected to the fluid pressure to be sealed, but in which the sealing force exerted by the sleeve on the movable member increases but little in response to an increase in such fluid pressure, so that the friction between the sleeve and the movable member remains at a substantially constant low value regardless of fluctuations in such fluid pressure.

Other objects and advantages of the invention will appear from the following specification and from the drawings, which are for the purpose of illustration only and in which:

Fig. 1 is a longitudinal sectional view of my invention in a preferred installation;

Fig. 2 is an enlarged diagrammatic sectional view illustrating the position of the sealing sleeve of the invention when first installed and prior to operation;

Fig. 3 is a view similar to Fig. 2, but illustrating the disposition of the parts upon operation of the device;

Fig. 4 is a cross-sectional view taken on the line 4—4 of Fig. 1;

Fig. 5 is an enlarged fragmentary longitudinal sectional view illustrating the shape of the sealing sleeve prior to assembly; and Fig. 6 is a graph showing typical operating data as to the invention.

Referring to the drawings, I show a rotatable or reciprocable shaft 10 passing through a housing plate 11, there being sufficient clearance between the shaft and the housing plate to permit oil, or other liquid, to flow along the surface of the shaft in the direction of the arrow 12, it being assumed that such liquid is under substantial pressure, such as, for example, a pressure of fifteen pounds per square inch, although my invention may be employed to seal against either higher or lower fluid pressures as desired. Such situation normally occurs where a lubricant or other fluid is attempted to be confined about such a rotating or reciprocating shaft.

Formed in the housing plate 11 is a circular recess 13 adapted to receive the sealing device 14 of the present invention. The sealing device 14 includes an outer shell member 15, which is annular in form, and an inner shell member 16, also annular in form, which together form a retaining means of the invention. The outer shell member 15 has an annular peripheral face 17 which fits into the circular recess 13, being held therein by a press fit or otherwise, and is provided with an inner face 18 which provides a small clearance with the periphery of the shaft 10. The outer shell member 15 is provided with an inner cavity formed by a cup-shaped guide wall 19, within which cavity is disposed the inner shell member 16. The inner shell member 16 is sufficiently smaller than the outer shell member 15 to provide a guide passage 21 therebetween which includes an outer annular portion 22 which is substantially parallel with the shaft 10 and an inner portion 23 which is substantially perpendicular to the shaft, the inner portion of the passage preferably being substantially thicker than the outer portion thereof.

Disposed in the guide passage 21 is a substantially tubular sleeve 25 formed of resilient material, such as, for example, synthetic rubber, nylon, or leather, and preferably one having small but significant cold-flow characteristics. The inner end of the sleeve 25 which engages the shaft 10 is provided with an external bevelled face 26 providing a relatively narrow end edge 27 perpendicular to the inside of the sleeve prior to assembly, as best shown in Fig. 5. The bevelled face 26 and the end edge 27 intersect at an obtuse angle providing an annular sealing edge 27a. The outer end of the sleeve 25 is provided with an internally beveled face 28 which is engaged by a mating annular follower member 29. The follower member 29 is adapted to slide axially in the outer annular portion 22 of the guide passage 21 and may engage either the inner or outer wall thereof or both (as illustrated). The follower member 29 is urged into engagement with the bevelled face 28 of the sleeve 25 by a compression spring 30, which in turn engages a shoulder 31 formed integrally on the inner shell member 16. The shoulder 31 is received in an annular groove 32 formed in the outer shell member 15 and retained therein by a press fit or otherwise. The sleeve 25 at its outer end is provided with an external annular sealing lip 33, as best shown in Fig. 5, preferably having a sharp annular sealing edge 33a which is flared outwardly from the generally tubular portion of the sleeve 25 and which engages the guide wall 19 and forms a fluid-tight seal therewith.

As will be noted, substantial clearance is left between the inner shell member 16 and the shaft 10 so as to permit fluid to pass therebetween to the sealing edge 27 of the sleeve 25. The shoulder 31 is provided with drilled passages 35 which communicate with radial grooves 36 to provide a passage for fluid under pressure from the shaft 10 to the outer end of the guide passage 21.

The inner shell member 16 is formed with a rounded throat 37 which serves as a stop to limit movement of the sealing edge 27 along the shaft 10. As best shown in Figs. 2 and 3, the throat 37 is preferably smoothly rounded so as to permit slight in-and-out movement of the sleeve 25 on the curved surface of the throat when the shaft 10 is not truly concentric with the axis of rotation thereof.

The sealing device 14 is initially assembled as illustrated in Figs. 1 and 2, at which time no fluid pressure is exerted on the sleeve 25. As will be noted, when initially assembled, the sleeve 25 is disposed so that the sealing edge 27a makes sealing engagement with the shaft 10, as indicated in Fig. 2, the bevelled sealing face 26 not being initially in engagement with the shaft. The compression spring 30 is sufficiently strong to retain the edge 27a of the sleeve 25 in the position illustrated in Figs. 1 and 2 upon assembly, in which position it forms an immediate fluid seal with the shaft 10. Upon assembly, as illustrated in Figs. 1 and 2, fluid under pressure may be admitted in the direction of the arrow 12 to flow between the housing plate 11 and the shaft 10 until it contacts the inner wall of the sleeve 25, the fluid also flowing outwardly through the radial grooves 36 and through the drilled passages 35 into the space behind the follower member 29, where it exerts a longitudinal pressure on the follower member and, in turn, on the outer end of the sleeve 25, tending to move the outer portion of the sleeve axially in the direction of the arrow 12. Due to the fact that the sleeve 25 is bent inwardly into engagement with the shaft 10, and due to the provision of the bevelled face 26, the inner end of the sleeve quickly bends back upon itself to the position illustrated in Fig. 3, in which the bevelled face 26 makes a substantially flat engagement with the periphery of the shaft 10 with most of the sealing pressure being exerted in the annular zone adjacent the edge 27a, and the edge 27 wedges between the inner shell member 16 and the shaft. Rotation of the shaft 10, or other movement thereof, also encourages this bending movement of the sleeve 25, the position illustrated in Fig. 3 being the normal operating position of the sleeve. Since the outer end of the sleeve 25 is of greater diameter than the inner end thereof when in operating position, the area presented to pressure is greater on the outer end than on the inner end, and this differential area causes the fluid pressure applied to the outer end of the sleeve to continuously urge the same to movement toward the shaft, and thus helps to retain sealing engagement between the inner end of the sleeve and the shaft. Wear on the bevelled face 26 of the sleeve, due to movement of the shaft 10 relative thereto, is compensated for automatically by movement of the sleeve due to the action of the compression spring 30. The sleeve 25 is thus continuously fed to the shaft to maintain sealing engagement therewith and to compensate for wear on the engaging bevelled face 26 thereof. The desired bending movement of the inner end of the sleeve 25 is permitted, of course, by the fact that the inner portion 23 of the guide passage 21 is substantially thicker than the inner end of the sleeve, and this is a feature of the invention.

It would normally be supposed that, due to the difference in areas of the inner and outer ends of the sleeve 25, an increase in fluid pressure on the outer end of the sleeve would substantially increase the torque which the sealing edge 26 of the sleeve exerts on the shaft 10. This, however, is not the case. Extensive torque tests have clearly established that although an increase in fluid pressure somewhat increases the torque on the shaft, the increase of torque with fluid pressure is not a straight-line relation, and that even when the sleeve 25 is subjected to a fluid pressure of 250 pounds per square inch on the model tested the torque exerted by the sleeve on the shaft 20 increases only slightly, and in no case enough to seriously increase the load on the shaft or the wear on the sleeve. This is not true of any prior art seals of which I have knowledge, in which any substantial increase in fluid pressure increases the torque to a value at which the load on the shaft is seriously increased and the prior art seals may wholly fail. This comparison is illustrated by the graph of Fig. 6, in which a typical operation of my invention is illustrated by the curve 50 and a typical operation of a conventional type of shaft seal is illustrated by the curve 51, and in which torque on the shaft in inch pounds is plotted against fluid pressure on the seals in pounds per square inch, both seals being operated on a shaft having a diameter of ⅞ inches and rotating at 4000 revolutions per minute. As will be apparent from a study of Fig. 6, the initial torque of my invention on the shaft, with zero fluid pressure on the seal was only approximately 0.17 pounds, whereas the torque exerted by the conventional seal under identical conditions was approximately 1.75 pounds, illustrating a substantial advantage of my invention when operating without any pressure differential across the seals. More important, at 250 pounds per square inch fluid pressure, the shaft torque exerted by my invention increased to only 1.25 pounds, whereas with the conventional seal the shaft torque increased to 8 pounds. Exerting such low shaft torques over a wide range of fluid pressures, my invention will provide adequate sealing for many hundreds of hours of operation, which is not possible with any type of conventional shaft seal tested by me. While the reasons for this markedly superior action of my device are not at this time sufficiently clear to permit their statement, I believe they are due largely, if not wholly, to reverse bending of the sleeve 25 as described above.

The application of fluid pressure on the follower 29 in the direction of the arrow 12, as described above, causes the follower to wedge the sealing edge 33a of the sealing lip 33 formed on the outer periphery of the sleeve 25 into tight fluid sealing engagement with the cup-shaped guide wall 19 of the outer shell member 15. This is an important feature of the invention, as it prevents leakage of fluid along the outer wall of the sleeve 25. Leakage of fluid along the inner wall of the sleeve 25 is not detrimental, as it merely increases the pressure of engagement of the bevelled face 26 with the shaft 10, and, in fact, is desirable, as it applies a fluid pressure to the inner wall of the sleeve tending to hold it against the cup-shaped wall 19, thus preventing rotation of the sleeve with the shaft, which is undesirable. Any eccentricity or run-out of the shaft 10 relative to the housing plate 11 is compensated for by the floating characteristic of the inner end of the sleeve 25, which maintains sealing engagement with the shaft regardless of such eccentricity or run-out. The provision of the roundly contoured throat 37 materially assists the "working" action of the sleeve 25 under eccentricity conditions and provides a smooth surface on which the inner wall of the sleeve adjacent the sealing edge 27 can slide in and out in synchronism with shaft movement, if any. The edge 27 is also important, where the shaft 10 has run-out or eccentricity, to prevent any undesirable pumping of liquid by movement of the sleeve, which sometimes occurs in the absence of such a relatively sharp edge.

When the application of fluid pressure is in the direction of the arrow 12, it will be seen that there are four zones at which the sleeve 25 makes sealing contact. First, a rubbing sealing contact is provided between the sleeve 25 and the shaft 10 on the bevelled face 26, as previously described, which seals against fluid leakage along the shaft past the sleeve. Second, a sealing contact is established between the inner side of the sealing edge 27 and the throat 37 of the inner shell member 16, which tends to prevent circulation of fluid therepast between the clearance between the shell member and the shaft and the guide passage 21. Third, a sealing contact is established between the outer surface of the sleeve 25 and the outer guide wall 19 at the zone 38. Fourth, the sealing edge 33a tends to form a further sealing contact between the sleeve 25 and the outer guide wall 19, resulting from the longitudinally directed force on the outer end of the sleeve and the wedging action produced by the bevelled face of the follower member 29. It will be understood that fluid pressure in the direction of the arrow 12 helps maintain these sealing contacts. On the other hand, when pressure conditions are reversed, for example, by drawing a vacuum on the interior of the housing 11 to the right of the sleeve 25, as seen in Fig. 1, a fluid pressure differential is established across the sleeve at the zone 38 tending to separate the sleeve from the guide face 19 at such zone, and this may occur if the spring 30 is not sufficiently strong, or if, due to eccentricity of the shaft 10, a pumping action occurs due to movement of the sleeve along the guide face 19. Under such vacuum conditions, the sealing edge 33a wedges between the outer guide face 19 and the follower member 29 and is urged into sealing contact therebetween by fluid pressure. Thus, under such vacuum conditions sealing contact is maintained between the sleeve 25 and the outer guide face 19, even though the sleeve may be moved out of contact therewith at the zone 38.

While I have described a preferred embodiment of my invention and a preferred use thereof, it will be understood that certain elements and parts thereof are only representative of other elements and parts which may be substituted therefor without departing from the spirit of my invention, and, consequently, I do not intend to be limited by the foregoing description, but desire to be afforded the full scope of the following claim.

I claim as my invention:

In a device for forming a fluid seal with a cylindrical surface, the combination of: an annular shell having an inner annular face adapted to be disposed adjacent to and concentric with a portion of said surface, and having a guide wall adapted to guide one end of a tubular member into engagement with said surface; a tubular resilient sleeve disposed in engagement with said wall and adapted to be guided by said wall so that said one end makes sealing engagement with said surface, the other end of said sleeve being provided with a bevelled face; a follower ring engaging said bevelled face; and means for exerting an axial force on said follower ring so that said follower ring can exert a force on said bevelled face tending to move said sleeve along said wall into said sealing engagement.

JOHN H. F. STEWART.

REFERENCES CITED

The following references are of record in the file of this patent:

UNITED STATES PATENTS

| Number | Name | Date |
|---|---|---|
| 168,980 | Gifford | Oct. 19, 1875 |
| 1,118,315 | Trist | Nov. 24, 1914 |
| 1,867,045 | Young et al. | July 12, 1932 |
| 2,007,501 | Millmine | July 9, 1935 |
| 2,100,113 | Travis | Nov. 23, 1937 |
| 2,232,293 | Toennies | Feb. 18, 1941 |
| 2,264,741 | Chamberlain | Dec. 2, 1941 |
| 2,284,424 | Hein | May 26, 1942 |
| 2,332,763 | Stewart | Oct. 26, 1943 |